(12) United States Patent
Amirzadeh-Asl

(10) Patent No.: US 7,341,625 B2
(45) Date of Patent: Mar. 11, 2008

(54) METHOD FOR THE PRODUCTION OF COATED, FINE-PARTICLE, INORGANIC SOLIDS AND USE THEREOF

(75) Inventor: Djamschid Amirzadeh-Asl, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 10/506,462

(22) PCT Filed: Mar. 5, 2003

(86) PCT No.: PCT/EP03/02239

§ 371 (c)(1),
(2), (4) Date: Dec. 1, 2004

(87) PCT Pub. No.: WO03/074615

PCT Pub. Date: Sep. 12, 2003

(65) Prior Publication Data

US 2005/0107493 A1    May 19, 2005

(30) Foreign Application Priority Data

Mar. 6, 2002    (DE) ................. 102 09 698

(51) Int. Cl.
*C04B 14/00* (2006.01)
(52) U.S. Cl. .............. 106/400; 106/499; 523/160; 523/210
(58) Field of Classification Search ............. 523/205, 523/210, 216, 160, 161; 106/400, 499
See application file for complete search history.

(56) References Cited

U.S. PATENT DOCUMENTS

| 4,563,221 A | | 1/1986 | Humphreys |
| 4,608,401 A | | 8/1986 | Martin |
| 5,034,207 A | * | 7/1991 | Kerner et al. ............ 423/339 |
| 5,135,967 A | | 8/1992 | Aumann et al. |
| 5,719,206 A | * | 2/1998 | Mihoya et al. ............ 523/212 |
| 6,197,104 B1 | | 3/2001 | Kostelnik et al. |
| 2002/0102404 A1 | | 8/2002 | Nakai et al. |
| 2003/0027897 A1 | * | 2/2003 | Mei et al. ............ 523/216 |

FOREIGN PATENT DOCUMENTS

| DE | 39 27 777 A1 | 2/1991 |
| DE | 42 07 722 A1 | 12/1992 |
| DE | 44 04 953 A | 8/1995 |
| DE | 197 51 857 A1 | 5/1999 |
| DE | 198 39 856 A1 | 4/2000 |
| DE | 199 07 703 A | 8/2000 |
| DE | 199 10 521 A1 | 9/2000 |
| DE | 100 05 685 A | 8/2001 |
| EP | 0 023 387 A1 | 2/1981 |
| EP | 0 029 137 B1 | 2/1984 |
| EP | 0 355 808 A2 | 2/1990 |
| EP | 0 380 430 A1 | 8/1990 |
| EP | 0 424 896 A | 5/1991 |
| EP | 0 811 654 A1 | 12/1997 |
| EP | 0 737 212 B1 | 6/1998 |
| EP | 0 572 128 B1 | 7/1998 |
| EP | 1 151 966 A1 | 11/2001 |
| FR | 2 554 119 | 5/1985 |
| GB | 1 537 223 | 12/1978 |
| GB | 2 009 204 A | 6/1979 |
| GB | 21 51 538 A | 7/1985 |
| GB | 2 173 781 A | 10/1986 |
| GB | 2 293 827 A | 4/1996 |
| JP | 58-222133 | 12/1983 |
| JP | 7-292194 A1 | 11/1995 |
| WO | WO 92/02587 A1 | 2/1992 |

OTHER PUBLICATIONS

JP1-131265 A1 Patent Abstract, published May 24, 1989; Applicant—Mitsubishi Kasei Vinyl.

* cited by examiner

*Primary Examiner*—Edward J. Cain
(74) *Attorney, Agent, or Firm*—Fulbright & Jaworski L.L.P.

(57) ABSTRACT

Disclosed is a method for producing coated, fine-particle, inorganic solids, the surface of which is coated with fine inorganic solid particles containing at least two different organic additives. At least one of said additives contains a wetting agent, dispersing agent, or deflocculant. The additives represent a maximum of 15 percent by weight of the coated solids.

3 Claims, No Drawings

METHOD FOR THE PRODUCTION OF COATED, FINE-PARTICLE, INORGANIC SOLIDS AND USE THEREOF

This is a §371 of PCT/EP03/02239 filed Mar. 5, 2003, which claims priority from German 102 09 698.8 filed Mar. 6, 2002, each of which are hereby incorporated by reference.

The invention relates to a process for the preparation of coated finely divided inorganic solids and to their use.

Inorganic solids (e.g. inorganic pigments or fillers) are incorporated inter alia as functional additives in the form of powders or dispersions into synthetic polymers, surface coatings, paints/inks (e.g. printing inks), fibres, paper (e.g. paper for lamination), adhesives, ceramics (e.g. electroceramics and magnetic ceramics), enamels, adsorbents, ion exchangers, grinding and polishing agents, cooling lubricants and cooling lubricant concentrates, refractory products, hard concrete materials, medical products and cosmetics (e.g. powders, ointments, toothpastes). In order that the inorganic solids are able to develop their desired properties in such fields of application, very good and uniform distribution of the finely divided inorganic solids in the particular system in question is desirable. Such uniform distribution is imperative in the case of incorporation into polymers in particular.

In order to improve the processing properties of the finely divided, inorganic solids, DE 198 39 856 A1 has proposed embedding them into a matrix consisting of an organic carrier material, The pulverulent intermediate formed thereby consists of individual particles having a size of <1 μm. Such a particle in turn contains several individual inorganic solids particles, which are embedded in the organic matrix. Disadvtantages of these additives are the relatively high content of organic carrier material and the relatively expensive process for the preparation of these additives.

In DE 100 05 685 A1, it is proposed to coat finely divided barium sulfate with an organic substance, each individual barium sulfate particle being coated with a layer of organic substance. In this process, the filter cake of barium sulfate can be processed to form a paste, with which the organic substance is mixed. The mixture is then dried. In a variant of the process, the filter cake of barium sulfate is dried and then the organic substance is added. Both processes have the disadvantage that the distribution of the organic substance on the barium sulfate particles is not uniform. In a further is process variant it is proposed to suspend the filter cake of barium sulfate in water again, to add the organic substance and then to dry the mixture. Although this process results in better distribution of the organic substance on the barium sulfate particles, it has the disadvantage that a relatively large amount of water is required for preparing the suspension, which water must subsequently be removed again.

The object of the invention is to overcome the disadvantages of the prior art and provide a process with which finely divided inorganic solids can be modified with an organic substance in such a manner that they can readily be incorporated as additives into various systems (e.g. polymers, surface coatings, paints/inks, paper, ceramics, medical products or cosmetic products). In particular, the organic substance is to be distributed uniformly over the surface of the inorganic solids, and the proportion of organic substance is to be less than 15 wt. %, preferably less than 10 wt. %, of the finished additive (coated inorganic finely divided solids). Furthermore, it is to be possible to carry out the preparation process using a smaller amount of water than in processes known hitherto in which the organic substance is added to a suspension of finely divided inorganic solids in water. If required, it is also to be possible to carry out the modification of the finely divided inorganic solids with the organic substance without using any water at all.

The object is achieved by a process in which the surface of finely divided inorganic solids particles is coated with at least two different organic additives, at least one additive comprising a wetting agent, dispersing agent or defloccu- lating agent and the proportion of additives being not more than 15 wt. %, preferably not more than 10 wt. %, or 5 wt. %, and particularly preferably not more than 3 wt. %, of the coated solids.

There are preferably used as the finely divided inorganic solids, separately or in the form of a mixture, titanium dioxide, barium sulfate, lithopone, zinc sulfide, zinc oxide, calcium carbonate, calcium sulfate, iron oxide, silicon dioxide, talcum, kaolin, mica, aluminium oxide, aluminium hydroxide, metal titanates, coloured titanates (e.g. chrome nickel titanates), zirconium oxide, macnesium oxide, hydro- talcite, chalk, mixed-phase pigments, anticorrosive pigments, inorganic flameproofing pigments, black pigments (e.g. iron oxide black), inorganic special-effect pigments, or metal nitrides, carbides and borides.

Wetting, dispersing or deflocculating agent is here to be understood as meaning a surface-active substance which facilitates the dispersion (=breaking up) of a pulverulent substance in a liquid medium by lowering the surface tension between two oppositely charged components by reversal of the charge of the surface. As a result, the agglomerates that are present are broken down in the dispersion process, so that re-agglomeration (=accumulation) or flocculation (=aggregation) is prevented.

As wetting, dispersing or deflocculating agents (referred to only as dispersing agents hereinbelow) there may be used both ionic and non-ionic dispersing is agents. The following substances car: preferably be employed: alkali metal (especially Na and K) salts or ammonium salts of organic acids (e.g. salts of poly(meth)acrylic acid), alkali metal salts of acrylate or methacrylate copolymers (having a preferred molecular weight of up to 15,000), polyphosphates (inorganic or organic polyphosphates, e.g. poly(meth)acrylate phosphates), generally poly(meth)acrylates, polyethers, anionically modified polyethers, fatty alcohol polyglycol ethers, modified polyurethanes or anionically active aliphatic esters.

The added amount of dispersing agent is dependent on the mean particle size of the inorganic solids. The finer the inorganic solids, the greater the added amount of dispersing agent. The added amount of dispersing agent is preferably from 0.01 to 10 wt. %, particularly preferably from 0.01 to 5 wt. %, or from 0.1 to 3 wt. %, based on the finished coated product.

The second organic additive preferably comprises one or more of the following substances: carboxylic acids, soaps, metal soaps, alcohols (e.g. 1,1,1-trimethylol-propane), pentaerythritol, neopentyl glycol, polyglycols (e.g. polyethylene glycol), polyethylene glycol ethers, organic eaters (e.g. neopentyl glycol dibenzoate), silanes, siloxanes, silicone oils, organic sulfones of the formula $RSO_2R$, organic ketones (R—(C=O)—R), organic nitrites (RCN), organic sulfoxides ($R_2$-$SO_2$), organic amides (R—(C=O)-NR'R or R—(S=O)-ONR'R), fatty acid esters or fatty acid amides.

The added amount of the second organic additive is also dependent on the mean particle size of the inorganic solids. The finer the inorganic solids particles, the greater the added amount of the second organic additive. The added amount of the second organic additive is preferably from 0.01 to 10 wt.

%, particularly preferably from 0.01 to 5 wt. %, or from 0.1 to 3 wt. %, based on the finished coated product.

The dispersing agent can be added to the finely divided inorganic solids separately or in admixture with the second organic additive. In the case of separate addition, the sequence of addition is in principle unimportant. For practical reasons, however, it is preferable in the case of separate addition first to add the dispersing agent and then to add the second additive.

The finely divided inorganic solids may be in the form of an aqueous suspension or in the form of a filter cake (paste-like or in dough form). It is advantageous to use a filter cake in the undried state (e.g. from current production) because the inorganic particles are then not completely agglomerated and the outlay in terms of dispersion after addition of the dispersing agent and of the second organic additive is thus minimised. If the finely divided inorganic solids are in powder form, it is expedient to carry out wet grinding of the inorganic solids before preparing a suspension. The suspension or filter cake preferably has a solids content of from 15 to 85 wt. %, particularly preferably from 25 to 80 wt. % and very particularly preferably from 50 to 80 wt. %.

Drying of the suspension provided with the additives can be carried out by means of conventional drying units. Spray driers, grinding driers or vacuum driers are preferably used. If required, the dried product can subsequently be ground, for example by means of a steam-jet mill, air-jet mill or pinned disk mill.

Surprisingly, it has been found that, even with a very high solids content, suspensions or filter cakes are liquefied after addition of the dispersing agent and of the second organic additive to such an extent that optimum distribution of the additives on the particle surface is ensured and the resulting suspension can be pumped without difficulty, which reduces the outlay in terms of the process considerably. Owing to the low water content of such a "liquid" suspension, the outlay in terms of drying is also reduced.

It is also possible to mix finely divided inorganic solids in powder form with the dispersing agent and the second organic additive in a mixer and then grind the mixture, for example in a steam-jet mill, air-jet mill or pinned disk mill.

The coated finely divided inorganic solids preferably have a mean particle size $d_{50}$ of from 0.001 to 20 µm, particularly preferably from 0.005 to 5 µm, very particularly preferably from 0.01 to 2 µm, or from 0.1 to 1 µm.

An advantage of the process according to the invention is that the coated finely divided inorganic solids that are obtained have excellent flowability and can very readily be transported pneumatically. On account of these properties, they can excellently be metered for addition to polymer melts. If the coated finely divided inorganic solids are in turn to be processed further in the form of a suspension or slurry, they can be processed without a high outlay in terms of dispersion to (also non-aqueous) "liquid" dispersions having a high solids content, for example from 30 to 80 wt. %, preferably from 40 to 75 wt. %. It has additionally been found that such suspensions have high stability to storage or, if solids should settle out, can very readily be re-dispersed. There is therefore no agglomeration of the particles.

If undesirable foam formation should occur during the preparation of such a suspension (dispersion in water or an organic solvent), the foam formation can be suppressed by addition of an antifoam. The added amount of antifoam is dependent on the nature of the inorganic solids and on the nature and amount of the dispersing agent used and oil the second organic additive. The added amount may be up to 3 wt. % but is generally less than 1.5 wt. %, in each case based on the solids content of the suspension.

The coated finely divided inorganic solids prepared by the process according to the invention can be used, for example, in plastics, especially in the preparation of polymers (e.g. thermoplastic or thermosetting polymers), in surface coatings, paints/inks (e.g. printing inks), fibres, paper (e.g. paper for lamination), adhesives, ceramics (e.g. electroceramics and magnetic ceramics), enamels, adsorbents, ion exchangers, grinding and polishing agents, cooling lubricants and cooling lubricant concentrates, refractory products, hard concrete materials, medical products and cosmetics (e.g. powders, ointments, toothpastes).

The coated finely divided inorganic solids prepared by the process according to the invention are distributed in polymers much better than finely divided inorganic solids treated according to the prior art. This manifests itself inter aria in the so-called pressure filter test.

The subject-matter of the invention is explained in greater detail by means of Examples:

PREPARATION FOR EXAMPLES A AND 1

Preparation of a $BaSO_4$ Paste

In known manner, barium sulfate was precipitated from aqueous solution by reaction of barium ions with sulfate ions. The precipitated $BaSo_4$ was separated from the mother liquor and washed. The resulting paste-like filter cake consisted of 67 wt. % dry matter and 33 wt. % water. The particle size $d_{50}$ of the $BaSO_4$ particles was 0.45 µm.

COMPARISON EXAMPLE A

Coating of the $BaSO_4$ Surface with an Additive According to the Prior Art 200 l of demineralised water were placed in a stirrer vessel, and 120 kg of the prepared $BaSO_4$ paste (contained 80 kg of $BaSO_4$) were added, with stirring. 1330 ml of an aqueous 1,1,1-trimethylolpropane solution, which contained 600 g of 1,1,1-trimethylolpropane per litre of solution, were then added in portions in the course of 30 minutes under the action of the shearing forces of a dissolver (2000 rpm). 798 g (0.99 wt. %, based on the finished product) of 1,1,1-trimethylolpropane were thus introduced. The mixture was dispersed for a further 15 minutes. The resulting suspension had a solids content of 325 g/l (26.2 wt. %) and was spray-dried under the following conditions:

Inlet temperature 535° C., outlet temperature 135° C., spraying plate 18,000 rpm, throughput 110 l/h.

The resulting pulverulent $BaSO_4$ with a single-layer coating had a moisture content of 0.15 wt. % and a mean particle size $d_{50}$ of 0.54 µm.

The suspension proved to be problematical before drying in terms of its stirring and pumping properties. The reason was the high viscosity of the suspension, as was to be expected with a solids content of 26.2 wt. %.

EXAMPLE 1

Coating of the $BaSO_4$ Surface with a Dispersing Agent and a Second Organic Additive 28 l of demineralised water were placed in a stirrer vessel, and 149 kg of the prepared $BaSO_4$ paste (contained 99.8 kg of $BaSO_4$) were added, with stirring. 400 g of a 40% potassium polyacrylate copolymer solution in water (having a mean molar mass of about 5000) were then added in portions in the course of 30 minutes under the action of the shearing forces of a dissolver (2000 rpm). 160 g (0.16 wt. %, based on the finished product) of potassium polyacrylate copolymer were thus introduced. The mixture was dispersed for a further 15 minutes. 1642 ml of an aqueous 1,1,1-trimethylolpropane solution, which is contained 600 g of 1,1,1-trimethylolpropane per litre of solution, were then added in portions, with stirring. 985 g (0.96 wt. %, based on the finished product) of 1,1,1-trimethylolpropane were thus introduced. Stirring was then carried out for a further 15 minutes. The suspension so obtained had a solids content of 960 g/l (55.9 wt. %) and was spray-dried as described in Comparison Example A.

The coated $BaSO_4$ powder so prepared had a moisture content of 0.15 wt. % and a mean particle size $d_{50}$ of 0.48 µm.

Despite the very high solids content of 55.9 wt. %, the suspension had a surprisingly low viscosity before drying and accordingly exhibited very good stirring and pumping properties. The suspension could be dried without difficulty.

COMPARISON EXAMPLE B

Processing of the Coated $BaSO_4$ from Comparison Example A in a Polymer Melt

In a twin-screw extruder, 27 kg of $BaSO_4$ powder from Comparison Example A were incorporated into 23 kg of polyethylene terephthalate (PET from KoSa, type: Polyclear 1101). The temperature of the heating zone was 265° C. The concentration of $BaSO_4$ in the PET masterbatch so prepared was 54 wt. %.

EXAMPLE 2

Processing of the Coated $BaSO_4$ from Example 1 in a Polymer Melt

Analogously to Comparison Example B, 27 kg of the $BaSO_4$ powder from Example 1 prepared by the process according to the invention were incorporated into 23 kg of polyethylene terephthalate (PET from KoSa, type: Polyclear 1101).

EXAMPLE 3

Comparison of the Polymers from Example 2 and Comparison Example B by Means of the PF Value In order to check the distribution of the $BaSO_4$ solids particles in the polymer, pressure filter tests were carried out on both the 54% $BaSO_4$/PET masterbatches. The PF value obtained thereby is used as a measure of the quality of masterbatches. The lower the PF value, the better the quality of the masterbatches in terms of the distribution of the inorganic solids particles in the polymer. The masterbatches from Example 2 and Comparison Example B were melted continuously in an extruder and fed to a 14 µm screening cloth (filter area 6.16 cm²). The temperature was 265° C. in the 1st heating zone, 270° C. in the 2nd heating zone and 280° C. in the 3rd, 4th and 5th heating zones. The throughput was about 40 g/minute.

Measurement is complete when a pressure of 200 bar is reached or after 60 minutes at the latest. The pressure filter test values (PF value) are calculated by the following formula:

$$PF = \frac{(p_{max} - p_0) \times F \times 100}{(t \times K \times G)} [\text{bar} \times \text{cm}^2/\text{g}]$$

wherein:
$p_{max}$ =final pressure (bar)
$p_0$ =starting pressure (bar)
F =filter area (cm²)
t =measuring time (min)
K =concentration (% pigment)
G =throughput (g/min)

In this manner, a PF value of 0.87 bar·cm²/g was found for the masterbatch prepared in Comparison Example B and a PF value of only 0.19 bar·cm²/g was found for the masterbatch prepared in the Example according to the invention. This low PF value clearly shows the superiority of the coated finely divided inorganic solids prepared by the process according to the invention when incorporated into polymers.

The invention claimed is:

1. A process comprising coating a surface of finely divided inorganic solid particles with at least two different organic additives to form coated finely divided inorganic solids, wherein at least one of said additives is selected from the group consisting of a wetting agent, dispersing agent or deflocculating agent, wherein said finely divided inorganic solid particles are in the form of an aqueous suspension or in the form of a filter cake and the two different organic additives are coated on to the finely divided inorganic solid particles separately or in the form of a mixture, wherein the coated particles are dried to form coated finely divided inorganic solid particles and wherein the coated finely divided inorganic solid particles have a mean particle size $d_{50}$ of from 0.001 to 20 µm, wherein the wetting, dispersing or deflocculating agent comprises at least one of the substances selected from the group consisting of an alkali metal salt of an organic acid, an ammonium salt of an organic acid, an alkali metal salt of an acrylate copolymer, an alkali metal salt of a methacrylate copolymer, a polyphosphate, a poly(meth)acrylate, a polyether, an anionically modified polyether, a fatty alcohol polyglycol ether, a modified polyurethanes and an anionically active aliphatic ester.

2. A composition comprising the coated finely divided inorganic solid particles and a ceramic, wherein the inorganic solid particles are prepared by a process comprising coating a surface of finely divided inorganic solid particles with at least two different organic additives to form coated finely divided inorganic solids, wherein at least one of said additives is selected from the group consisting of a wetting agent, dispersing agent or deflocculating agent, wherein said finely divided inorganic solid particles are in the form of an aqueous suspension or in the form of a filter cake and the two different organic additives are coated on to the finely divided inorganic solid particles separately or in the form of a mixture, wherein the coated particles are dried to form coated finely divided inorganic solid particles and wherein the coated finely divided inorganic solid particles have a mean particle size $d_{50}$ of from 0.001 to 20 µm.

3. A composition comprising the coated finely divided inorganic solid particles and a cosmetic, wherein the inorganic solid particles are prepared by a process comprising coating a surface of finely divided inorganic solid particles with at least two different organic additives to form coated finely divided inorganic solids, wherein at least one of said additives is selected from the group consisting of a wetting agent, dispersing agent or deflocculating agent, wherein said finely divided inorganic solid particles are in the form of an aqueous suspension or in the form of a filter cake and the two different organic additives arc coated on to the finely divided inorganic solid particles separately or in the form of a mixture, wherein the coated particles are dried to form coated finely divided inorganic solid particles and wherein the coated finely divided inorganic solid particles have a mean particle size $d_{50}$ of from 0.001 to 20 μm.

* * * * *